(No Model.) 6 Sheets—Sheet 1.

G. W. NEWALL & J. F. BLYTH.
MOTOR ENGINE.

No. 401,578. Patented Apr. 16, 1889.

Witnesses.
Wiler Norton
Alvin Belt

George W. Newall
and James F. Blyth.
Inventors
By John J. Halsted & Son
their Atty's.

(No Model.) 6 Sheets—Sheet 2.

G. W. NEWALL & J. F. BLYTH.
MOTOR ENGINE.

No. 401,578. Patented Apr. 16, 1889.

Witnesses,
Will T. Norton
Alvin Bell

George W Newall
and James F. Blyth
Inventors
John J. Halsted & Son
their Attorneys (No Model.) 6 Sheets—Sheet 3.

G. W. NEWALL & J. F. BLYTH.
MOTOR ENGINE.

No. 401,578. Patented Apr. 16, 1889.

Witnesses,
Will T Norton
Alvin Bell

George W Newall
and James F Blyth
Inventors.
By John J Halsted & Son
their Attys (No Model.) 6 Sheets—Sheet 4.
G. W. NEWALL & J. F. BLYTH.
MOTOR ENGINE.
No. 401,578. Patented Apr. 16, 1889.
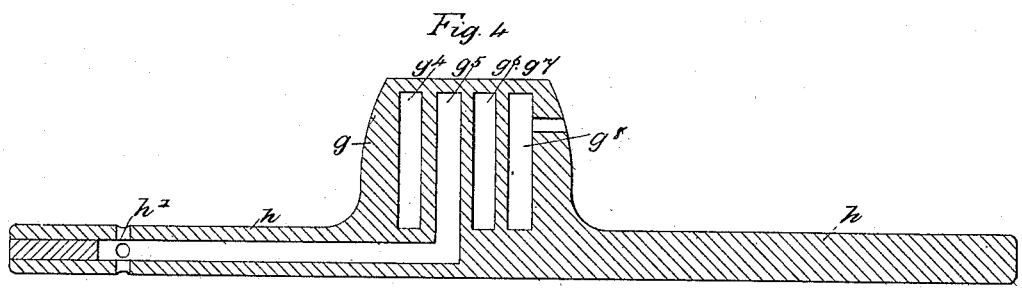
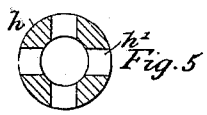
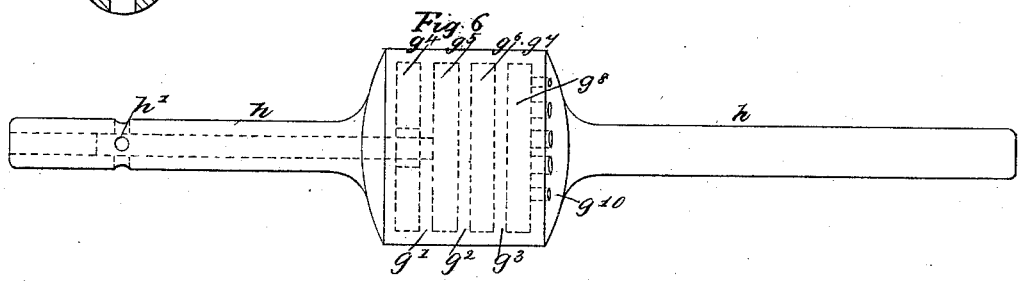

(No Model.) 6 Sheets—Sheet 5.
G. W. NEWALL & J. F. BLYTH.
MOTOR ENGINE.
No. 401,578. Patented Apr. 16, 1889.
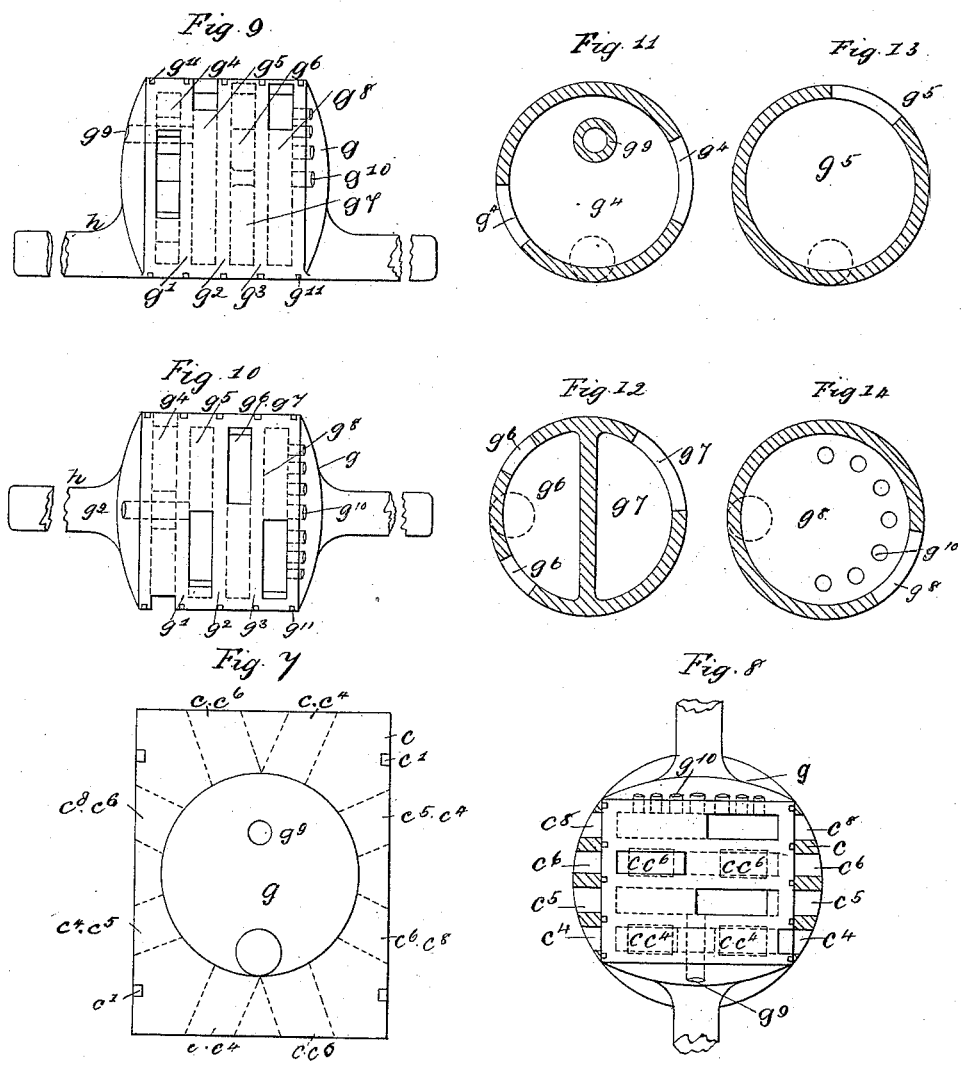

(No Model.) 6 Sheets—Sheet 6.

G. W. NEWALL & J. F. BLYTH.
MOTOR ENGINE.

No. 401,578. Patented Apr. 16, 1889.

Witnesses.
Will T. Norton

George W. Newall
James F. Blyth
Inventors
By John J. Halsted & Son
their Attys.

UNITED STATES PATENT OFFICE.

GEORGE WILLIAM NEWALL, OF MANOR PARK, COUNTY OF ESSEX, AND JAMES FREDERICK BLYTH, OF SYDENHAM, COUNTY OF KENT, ENGLAND.

MOTOR-ENGINE.

SPECIFICATION forming part of Letters Patent No. 401,578, dated April 16, 1889.

Application filed May 7, 1888. Serial No. 273,084. (No model.) Patented in Belgium March 13, 1888, No. 81,006.

*To all whom it may concern:*

Be it known that we, GEORGE WILLIAM NEWALL, engineer, of 14 First Avenue, Manor Park, in the county of Essex, and JAMES FREDERICK BLYTH, engineer, of 9 Oriel Villas, Newland's Park, Sydenham, in the county of Kent, England, subjects of the Queen of Great Britain, have invented certain new and useful Improvements in Steam or other Motor Engines and Pumps, (patented in Belgium March 13, 1888, No. 81,006,) of which the following is a specification.

These improvements have for their object in steam or other motive-power engines to develop the greatest power with the highest economy in as small space as possible.

In carrying out our invention we employ a hollow crank or eccentric provided with inlet and outlet ports or recesses arranged in connection with corresponding ports or recesses in circular pistons for distributing and conveying the fluid and an inner circular piston or circular reciprocating part fitting and working within a circular piston fitted within an outer circular cylinder, the one circular piston working substantially at right angles to the other like circular piston. Thus the outer circular cylinder is fitted by the circular piston working longitudinally in same. This circular piston contains a second like piston working at right angles to the axis of the former piston. Both pistons operate a hollow-ported crank, which hollow crank has suitable inlet and outlet ports for conveying or distributing the fluid.

Figure 1:
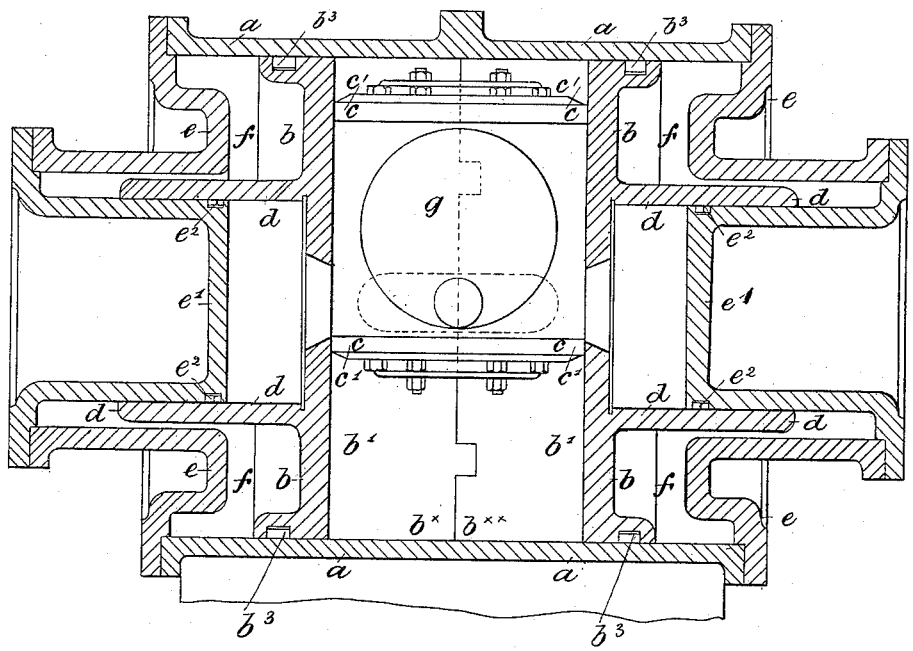
Figure 2:
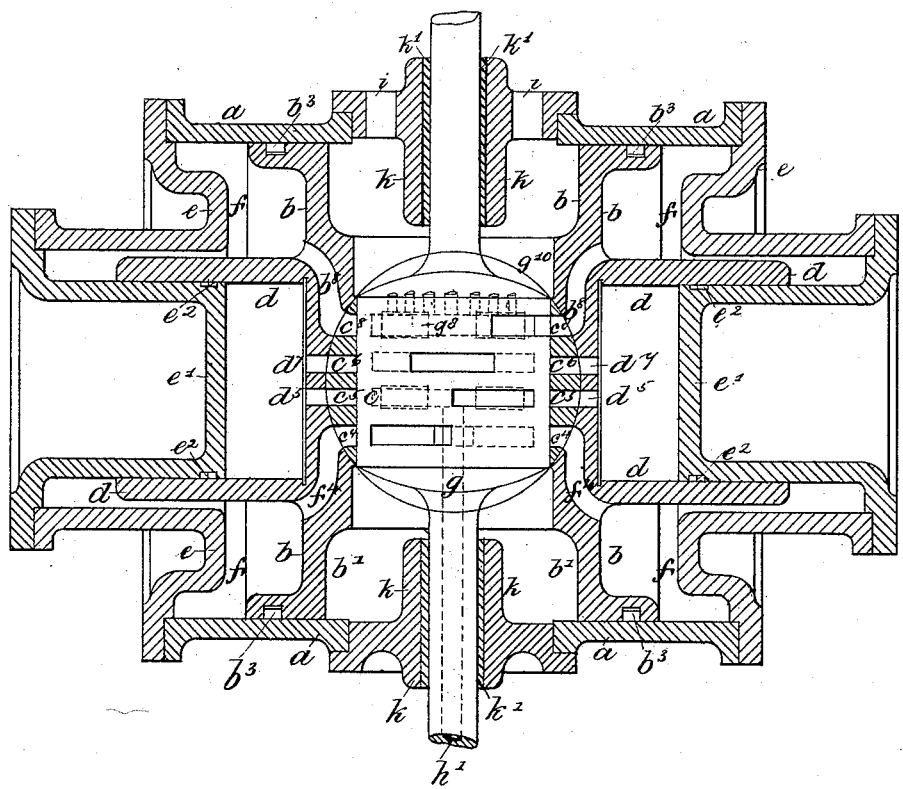
Figure 3:
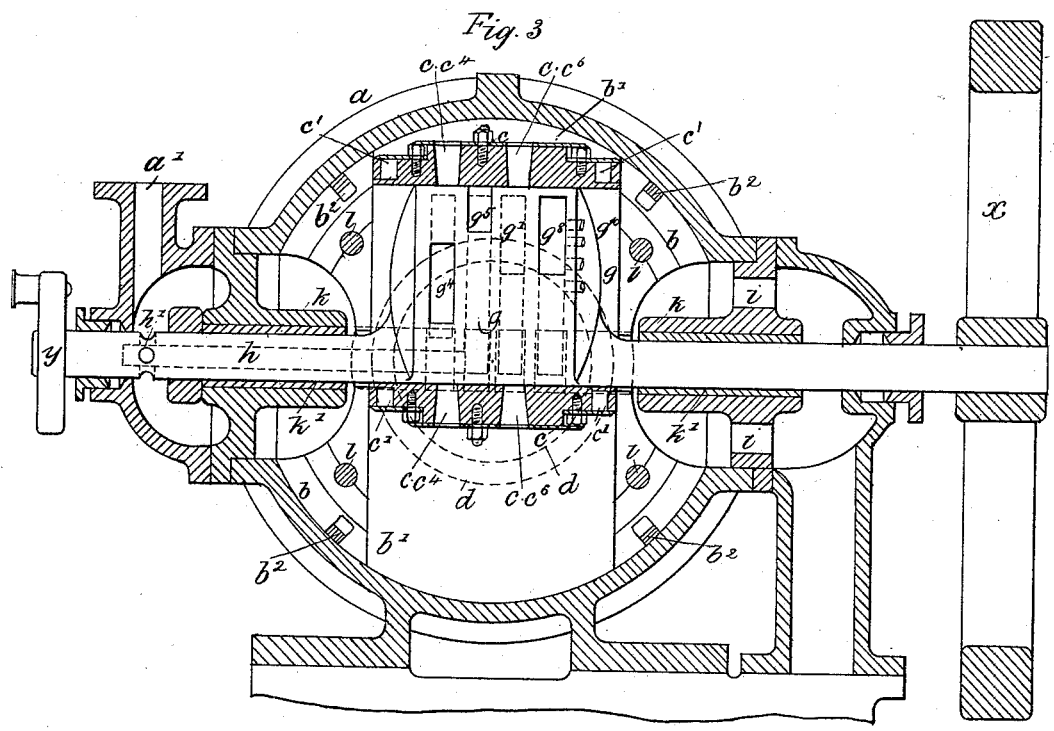

In the drawings, Figure 1 shows a longitudinal vertical section of an engine constructed according to the invention. Fig. 2 is a horizontal section taken at right angles to Fig. 1. Fig. 3 is a vertical section taken transversely of Fig. 1. Figs. 4 to 14 show various views separately of the inner piston and crank-shaft.

The drawings represent a triple-expansion engine in which the cylinder $a$ is shown in one piece, and within this cylinder $a$ is a circular piston, $b$, working longitudinally therein, and again within this piston $b$ is another piston, $c$, working at right angles to the piston $b$, $b^2$ $b^2$ being spring packing-pieces. $d$ is the high-pressure cylinder, which consists of a sleeve or pipe-piece, $d'$, cast on each side of the large or low-pressure piston $b$, Figs. 1, 2, 3, and 15, working longitudinally in the cylinder $a$. Suitable projections, $e'$ $e'$, are cast on the cylinder-covers $e$ $e$, which become the high-pressure piston, the sleeve or cylinder $d$ sliding and working along same. $e^2$ $e^2$ are recesses containing spring packing-rings suitable for keeping these parts fluid-tight.

$c$ is the second or intermediate circular piston working at right angles to the large circular piston $b$, and this also is fitted with spring packing-rings $c'$ $c'$, the large piston $b$ inclosing this second piston $c$ becoming a cylinder itself. The annular space $f$ between the sleeve or cylinder $d$ and the body of the cylinder $a$ forms the low-pressure cylinder.

In an engine constructed according to the foregoing description three pistons or surfaces, $e'$ $c$ $b$, may be arranged and working within one containing-cylinder, $a$.

The intermediate piston, $c$, is bored out to accommodate a crank-shaft or hollow eccentric, $g$, having three partitions, $g'$ $g^2$ $g^3$, Figs. 4 to 14, forming four spaces and steam-ports, $g^4$ $g^5$ $g^6$ $g^7$ $g^8$, cast in suitable positions for distributing the fluid to the various parts of the machine. The forms and positions relatively of the inlet and outlet ports adapted to various engines will readily be ascertainable by molding in the usual manner. Each of the circular pistons or surfaces $b$, $c$, and $e'$ have ports cast in them, which ports, when passing in line respectively with the ports provided in the cranked part $g$, become the inlets and outlets for the fluid.

Figure 15:
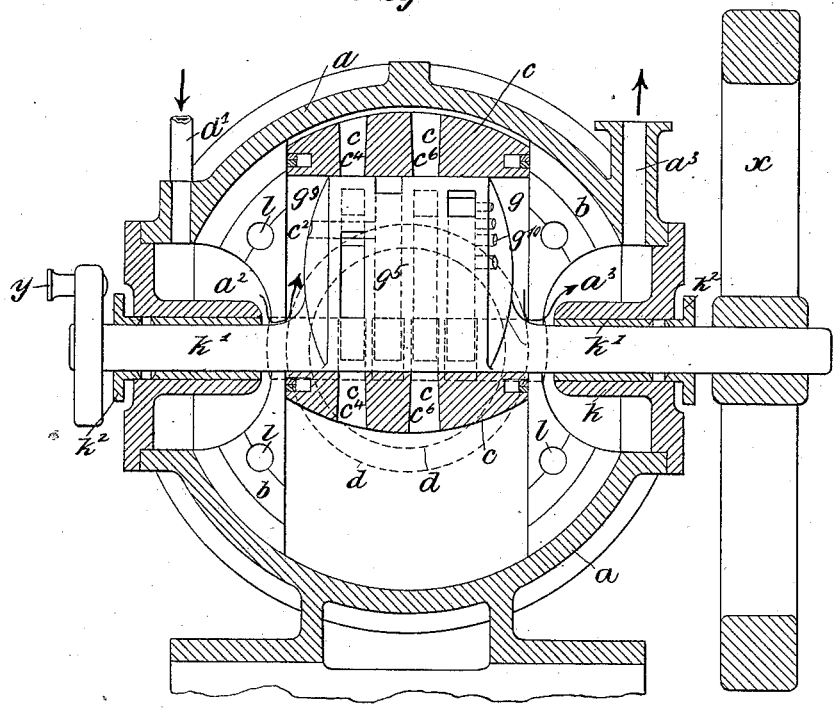

In the drawings, the inlet $h'$, Figs. 2, 3, 4, 5, and 6, for admission of fluid, is shown as being formed through the crank-shaft $h$ of the crank $g$, whence it is conducted into the cylinder $d$ and to the circular cylinders $b'$ and $a$, and the exhaust is led away from the holes $i$ $i$, Figs. 2 and 3, in the main bearing; but in place of this arrangement the fluid may be supplied by an inlet, $a'$, Fig. 15, and into the space $a^2$, passing into the space $c^2$ and through the inlet $g^0$, Figs. 7, 8, 9, 10, 11, and 15, into the space $g^5$, Figs. 9, 10, 13, and 15, and the exhaust may be formed through the side of the cylinder, as indicated at $a^3$ in Fig. 15. The crank-shaft or hollow eccentric $g$ may be formed with parallel peripherical surface, or it may be formed slightly conical, so that by suitable adjustment compensation may be made for wear and tear between the exterior parts of hollow eccentric $g$ and the inner surface of the circular piston $c$. The main bearings $k$ may also be made adjustable by fitting the brasses $k'$ in two halves and boring out the same slightly conical and fitted with adjusting-gland and screws $k^2$, or the bushes may be screw-threaded and screw into the bearing, so as thereby to compensate for the wear and tear; but we make no claim to this arrangement in itself.

The operation of the machine is as follows: Steam is led into the machine, so as to enter the hollow shaft, Figs. 2, 3, 4, 5, and 6, or casing, as the case may be, wherein are formed the inlet-holes $h'$, Figs. 3, 4, 5, and 6, to the hollow crank-shaft $h$. The fluid then passes into the compartment or first steam-port, $g^5$. When the port $g^5$ in this compartment is in line and open to the similar ports, $c^5$ and $d^5$, Figs. 2, 7, and 8, in the intermediate piston, $c$, and high-pressure cylinder $d$, the fluid is free to enter and exert its force alternately on one and then the other of the fixed high-pressure pistons $e'$, formed or applied on the cylinder-covers $e$, and as the sleeve or cylinder $d$ is now forced along the high-pressure piston $e'$ the crank $g$ is turned away from the inlet-ports $c^5$ and $d^5$, thereby cutting off the inlet pressure at any required position of the piston-stroke. After the steam has done its work in the high-pressure cylinder $d$ the fluid then passes back through the ports $d^7$ and $c^6$ into the compartments $g^6$ and $g^7$ of the crank, and from thence through the port $c\,c^6$ into the compartment or intermediate cylinder, $b'$, Figs. 1, 3, and 15, again. When the steam or fluid has done its work in the cylinder $b'$, and it passes on through the port $c\,c^4$, Figs. 3, 7, 8, 15, into the compartment $g^4$ of the crank, and from thence through the ports $c^4$ into the port $f^4$, linable with same, into the annular space $f$, Figs. 1 and 2, around the sleeve or pipe-piece $d$ into the low-pressure cylinder $a$, where the pressure forces the piston $b$ to the end of its stroke. On the return-stroke of this piston $b$ another and similar port, $b^8$, cast in the low-pressure piston $b$, comes in line with the port $c^8$ in the piston $c$, and then passes into the compartment and port $g^8$ in the crank-shaft $g$, and the fluid or spent steam is free to pass away to the condenser through the holes $g^{10}$, and then through the recesses $i\,i$ in the main bearings or otherwise, Figs. 2, 3, 8, 9, 10, 14, and 15.

$x\,x$ is a fly-wheel, and $y$ a crank from which motion may be transmitted.

At each revolution of the crank-shaft the above operation comes into play twice over—once at each end of the cylinder.

The drawings represent a double-acting triple-expansion engine having only three moving parts, six pistons, and six cylinders, all contained and working in one cylinder, as described. Each and every cylinder and piston may be lagged, if preferred, and the crank-shaft may have spring packing-rings $g''$, Figs. 9 and 10, fitted between each compartment.

The above description has so far treated only of those machines constructed on the triple-expansion principle; but an ordinary compound engine may be constructed by dispensing with the projections $d\,d$ on the larger pistons, $b\,b$, when the smaller or intermediate pistons, $c$, become the high-pressure pistons.

When constructing a compound engine with the same form of crank-shaft $g$, Figs. 7 to 14, as described in the triple-expansion engine, the crank-shaft $g$ then will only contain three compartments with the necessary inlet and outlet ports, as already described.

The arrangements, as already described and shown by the drawings, have pistons of various dimensions.

The cylinder $a$ is shown in one piece and the larger piston, $b$, in two halves, $b^\times\,b^{\times\times}$, and bolted together by bolts $l\,l$, Figs. 1, 3, and 15, as shown; also, the smaller piston, $c$, is in one piece for the arrangements of the character shown by Figs. 1, 2, 3, 7, 8, and 15; but this may be varied.

Having now particularly described and ascertained the nature of our said invention and in what manner the same is to be performed, we declare that what we claim is—

1. In a motive-power engine driven by steam or other fluid, a crank-shaft formed with inlet and outlet ports operating with an inner circular piston and an outer circular piston having corresponding ports, said inner piston and outer piston being contained and working one within and at right angles to the other and all within one outer circular cylinder, substantially as set forth.

2. A crank-shaft, $g$, provided with ports for passage of fluid, rotating within a correspondingly-ported circular opening in an inner circular piston working within an outer circular cylinder, the one circular piston working at right angles to the other circular piston, and all within one outer circular cylinder, arranged and operating substantially as set forth.

In testimony whereof we, the said GEORGE WILLIAM NEWALL and JAMES FREDERICK BLYTH, have hereunto set our hands.

GEORGE WILLIAM NEWALL.
JAMES FREDERICK BLYTH.

Witnesses:
HERBERT E. DALE,
WALTER J. SKERTEN,
Both of 17 Gracechurch Street, London, E. C.